(12) United States Patent
Tsui

(10) Patent No.: US 7,006,802 B2
(45) Date of Patent: Feb. 28, 2006

(54) UNIVERSAL TRANSMITTER

(76) Inventor: Philip Y. W. Tsui, 2203-35 Kingsbridge Garden Circle, Skymark West 1, Mississauga, Ontario (CA) L5R 3Z5

(*) Notice: Subject to any disclaimer, the term of this patent is extended or adjusted under 35 U.S.C. 154(b) by 600 days.

(21) Appl. No.: 10/051,781

(22) Filed: Jan. 15, 2002

(65) Prior Publication Data
US 2002/0137479 A1 Sep. 26, 2002

Related U.S. Application Data

(63) Continuation-in-part of application No. 09/885,466, filed on Jun. 19, 2001, which is a continuation of application No. 09/188,648, filed on Nov. 9, 1998, now Pat. No. 6,249,673.

(51) Int. Cl.
H04B 1/02 (2006.01)
(52) U.S. Cl. ............. 455/92; 455/69; 455/151.2; 455/161.1; 340/825.71; 340/825.69
(58) Field of Classification Search .......... 455/151.2, 455/151.1, 152.1, 161.1, 352, 92, 69; 340/825.71, 340/825.72, 825.73, 825.69, 825.22
See application file for complete search history.

(56) References Cited

U.S. PATENT DOCUMENTS

| | | |
|---|---|---|
| 4,535,333 A | 8/1985 | Twardowski |
| 4,623,887 A | 11/1986 | Welles, II |
| 4,626,848 A | 12/1986 | Ehlers |
| 4,771,283 A * | 9/1988 | Imoto ............ 340/825.71 |
| 4,825,200 A | 4/1989 | Evans et al. |
| 4,878,052 A | 10/1989 | Schulze |
| 4,905,279 A | 2/1990 | Nishio |
| 4,959,810 A | 9/1990 | Darbee et al. |
| 5,227,780 A | 7/1993 | Tigwell |
| 5,379,453 A | 1/1995 | Tigwell |
| 5,442,340 A * | 8/1995 | Dykema ............ 340/825.22 |
| 5,564,101 A | 10/1996 | Eisfeld et al. |
| 5,614,891 A | 3/1997 | Zeinstra et al. |
| 5,619,190 A | 4/1997 | Duckworth et al. |
| 5,661,804 A | 8/1997 | Dykema et al. |
| 5,680,134 A | 10/1997 | Tsui |
| 5,686,903 A | 11/1997 | Duckworth et al. |
| 5,699,054 A | 12/1997 | Duckworth |
| 5,699,055 A | 12/1997 | Dykema et al. |
| 5,790,948 A * | 8/1998 | Eisfeld et al. ............ 455/352 |
| 5,793,300 A | 8/1998 | Suman et al. |
| 5,815,086 A | 9/1998 | Ivie et al. |
| 5,841,390 A | 11/1998 | Tsui |
| 5,854,593 A * | 12/1998 | Dykema et al. ........ 340/825.69 |
| 5,864,751 A * | 1/1999 | Kazami ............ 455/161.1 |

(Continued)

Primary Examiner—Lana Le
(74) Attorney, Agent, or Firm—Crowell & Moring LLP

(57) ABSTRACT

A method and apparatus for a universal transmitter that can learn and emulate the transmission frequency and modulation pattern of a template transmitter, without prior knowledge of such information. The universal transmitter is then operable to transmit the "learned" modulation pattern and transmission frequency to actuate a remote control receiver operable with the template transmitter. The universal transmitter is capable of recognizing a fixed-code pulse-modulated, frequency shift keying, or other transmission without prior knowledge of the frequency and modulation pattern. The universal transmitter includes multiple programmable switches to allow the universal transmitter to learn the modulation pattern and frequency of multiple transmitting sources and store the values in non-volatile memory.

21 Claims, 9 Drawing Sheets

U.S. PATENT DOCUMENTS

| | | |
|---|---|---|
| 5,903,226 A | 5/1999 | Suman et al. |
| 6,005,508 A | 12/1999 | Tsui |
| 6,008,735 A | 12/1999 | Chiloyan et al. |
| 6,021,319 A * | 2/2000 | Tigwell ............... 455/151.2 |
| 6,249,673 B1 | 6/2001 | Tsui |
| 6,265,987 B1 * | 7/2001 | Wang et al. ........... 340/825.69 |

* cited by examiner

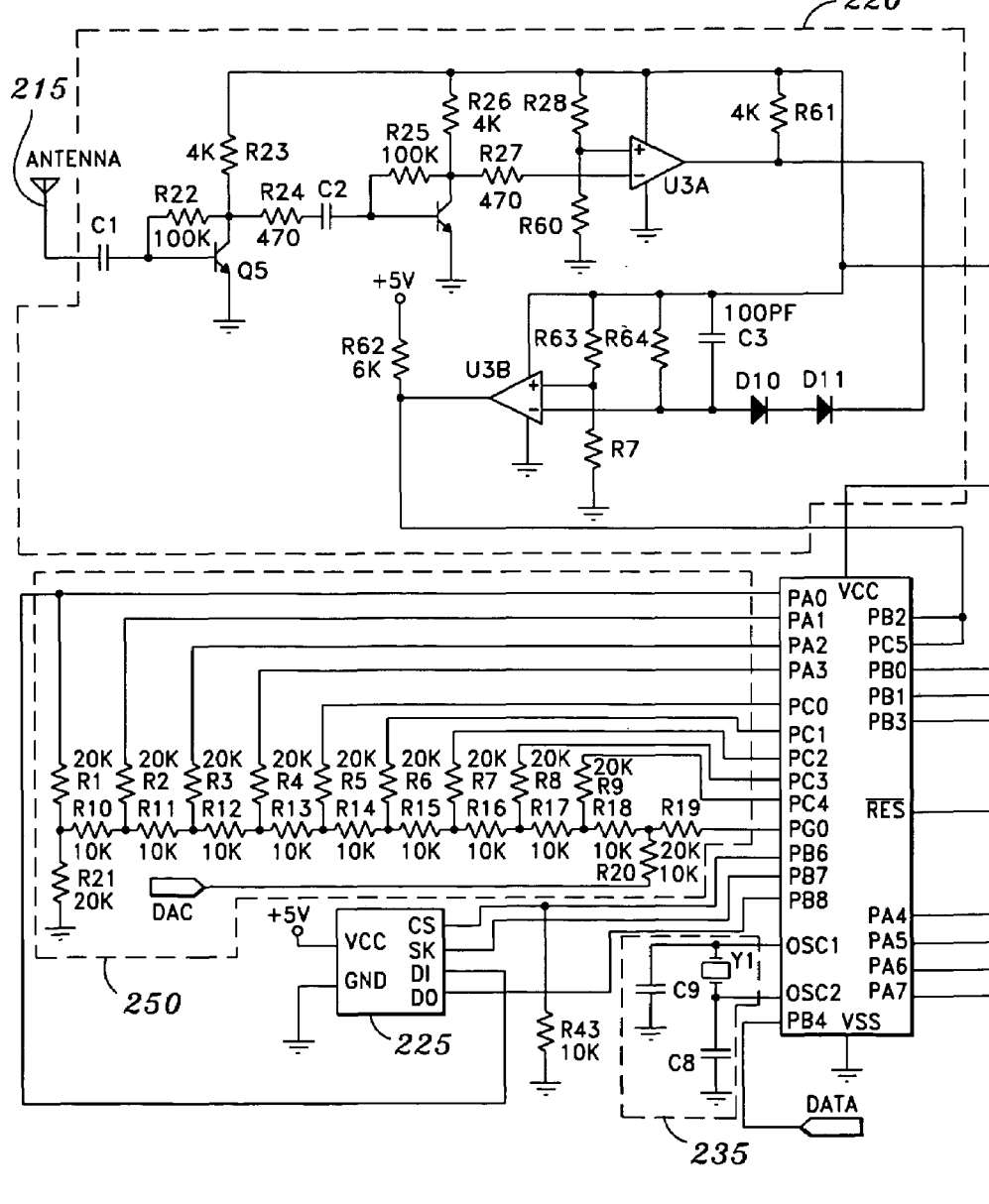

UNIVERSAL TRANSMITTER

CROSS-REFERENCES TO RELATED APPLICATIONS

This application is a continuation-in-part of application Ser. No. 09/885,466, entitled "UNIVERSAL TRANSMITTER", filed Jun. 19, 2001, which is a continuation of application Ser. No. 09/188,648, entitled "UNIVERSAL TRANSMITTER", filed Nov. 9, 1998, now U.S. Pat. No. 6,249,673, the contents of which are fully incorporated herein by reference.

BACKGROUND OF THE INVENTION

1. Field of the Invention

The disclosure relates generally to remote control systems, and specifically to a universal remote control transmitter that can acquire the transmission frequency and modulation pattern of another transmitter without prior knowledge of these parameters.

2. Background of the Invention

Transmitter-receiver controller systems are widely used for remote control and/or actuation of devices or appliances such as garage door openers, gate openers, security systems, and the like. For example, most conventional garage door opener systems use a transmitter-receiver combination to selectively activate the drive source (i.e., motor) for opening or closing the door. The receiver is usually mounted adjacent to the motor and receives a coded signal (typically radio frequency) from the transmitter. The transmitter is typically carried by a user and selectively activated by the user to open or close the garage door. These type of remote control systems typically employ VHF/UHF radio frequency transmissions.

In general, a remote control system has a remote transmitter and a receiver coupled to the device, which is to be controlled. When activated, the transmitter emits a modulated signal, which is recognized by the receiver to activate the device. In VHF/UHF-based systems, a transmitter typically emits a pulse-modulated VHF/UHF signal. The signal embodies a modulation pattern as a sequence of "signal on" and "signal off" intervals. The modulated signal emitted by the transmitter is recognized by the receiver. The modulation pattern of remote control systems is typically unique to restrict unauthorized access to the device being controlled.

Different manufacturers of such transmitter-receiver systems generally utilize different transmission protocols or patterns for transmitting the coded signal. Additionally, the manufacturers typically operate the transmitter-receiver systems at different transmission frequencies within the allocated frequency range for a particular type of system. The modulation pattern typically includes two aspects: 1) a device code (equivalent to a device address) for the transmitter and receiver, and 2) a transmission format, i.e., the characteristics of the transmitted signal including timing parameters and modulation characteristics related to encoded data. The transmission pattern used by one manufacturer is usually incompatible with that provided by other manufacturers.

Currently available transmitter-receiver systems typically employ custom encoders and decoders to implement the transmission pattern. These encoders and decoders are fabricated with custom integrated circuits such as application-specific integrated circuits (ASICs). They are fixed hardware devices and allow very limited flexibility in the encoding/decoding operation or in the modification of the encoding/decoding operation.

Thus, in such existing transmitter-receiver systems, it is necessary to know the transmission frequency accepted by the receiver and to match or determine the modulation pattern recognized by the receiver. In a number of transmitter-receiver systems, the modulation pattern is determined by setting a plurality of dual inline package (DIP) switches (or a modulation pattern selection circuit) on the transmitter and by similarly setting a plurality of DIP switches (or a corresponding modulation pattern selection circuit) on the receiver. Once the required frequency and the modulation pattern are defined, a compatible transmitter can be provided to operate with the receiver. The DIP switches or the modulation pattern selection circuit may also be manually reset to match the modulation pattern of signals transmitted by a new transmitter to that of the existing receiver. Alternatively, both the existing receiver and new transmitter can be reprogrammed with a new modulation pattern. However, existing reprogramming techniques require prior knowledge of the transmission frequency and modulation protocol of the existing transmitter. In addition, they can only be implemented in compatible transmitters and receivers using complex circuits.

BRIEF SUMMARY OF THE INVENTION

Embodiments herein disclose a universal transmitter. In one embodiment, the universal transmitter includes an input circuit including an antenna, a central processing unit (CPU) coupled to the input circuit, and a radio frequency (RF) circuit coupled to the CPU. The CPU is operable to generate a plurality of discrete digital outputs, and in response thereto, causes the RF circuit to generate and transmit a local RF signal at a corresponding plurality of discrete scanning frequencies. The input circuit receives the local RF signal and a template RF signal including a target frequency and a modulation pattern, and mixes the local RF signal and the template RF signal and provide a mixed signal. The CPU samples the mixed signal at the plurality of scanning frequencies, and determines the target frequency of the template RF signal in response to the plurality of samples.

Other embodiments are disclosed and claimed herein.

BRIEF DESCRIPTION OF THE DRAWINGS

FIGS. 3A and 3B illustrate a detailed diagram of a universal transmitter, according to one embodiment.

DETAILED DESCRIPTION OF THE PREFERRED EMBODIMENT

Disclosed herein is a universal transmitter that provides a low-cost remote control transmitter that can be programmed to "learn" the transmission frequency and modulation pattern of any template transmitter. The universal transmitter is then operable to transmit the "learned" modulation pattern and transmission frequency to actuate a remote control receiver operable with the template transmitter. The universal transmitter is capable of recognizing a fixed-code pulse-modulated, frequency shift keying, or other transmission without prior knowledge of the frequency and modulation pattern. That is, the transmitter is universal in that it is capable of transmitting at any frequency that is allocated for remote control devices and is capable of being programmed to generate a modulated signal with any modulation pattern based on any modulation protocol.

The universal transmitter can store the "learned" transmission frequency and modulation pattern of multiple transmitters in non-volatile memory. Thus, multiple programmable switches are provided to allow the universal transmitter to control multiple devices simultaneously. In one embodiment, the universal transmitter includes, among other devices, a micro-controller, oscillator for providing internal timing, memory for storing data representative of a modulation pattern and transmission frequency, input/output circuitry, and a digital to analog converter that controls a voltage controlled oscillator to generate signals over a wide range of frequencies (e.g., between 280 to 450 MHz or other frequency range).

Figure 1:
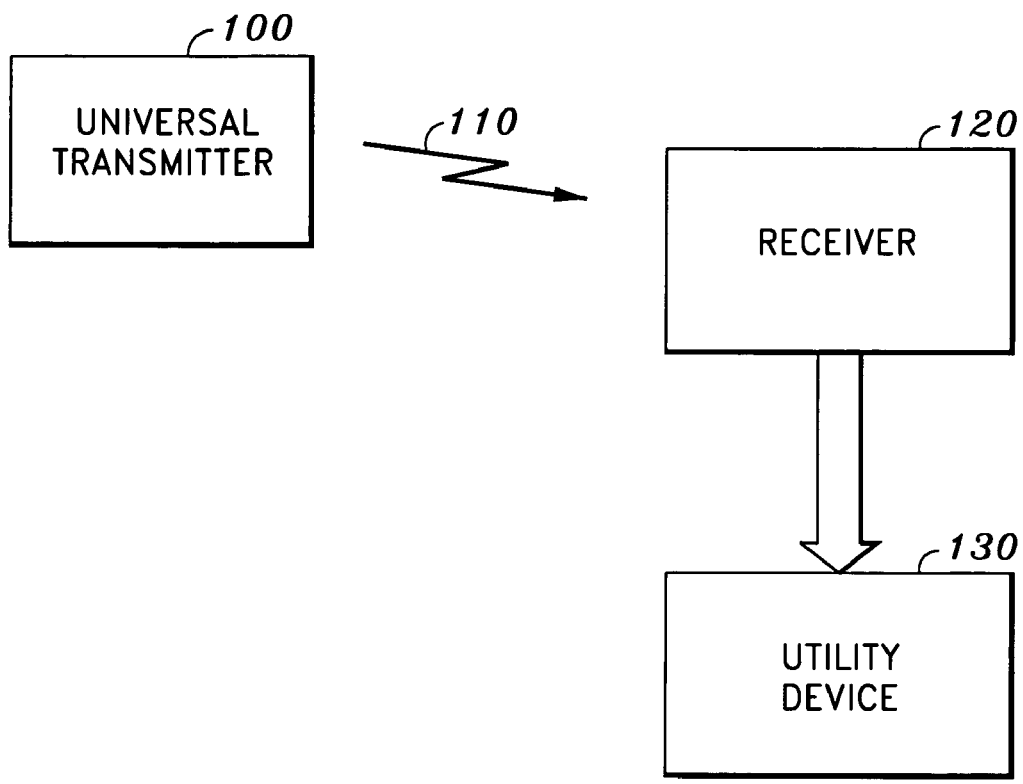
FIG. 1 illustrates a block diagram of a typical transmitter-receiver system.

Referring now to the drawings, and in particular to FIG. 1, there is shown a block diagram of a typical transmitter-receiver system. In FIG. 1, universal transmitter 100 is capable of generating an electromagnetic wave represented by the arrow 110. The frequency of the signal 110 generated by transmitter 100 and the encoding and data transmission scheme is a function of the particular transmitter design. A receiver 120 is adapted to receive the signals 110 from the transmitter 100, interpret the signals and produce an output signal to drive a utility device 130.

In a representative utilization, the transmitter 100 is a remote control device which can be used with the receiver 120 as part of a garage door opening system. In this representative utilization, utility device 130 may be the garage door mechanism, including the motor, drive mechanism, lighting apparatus and/or the like. For example, the utility device 130 opens or closes a garage door when activated by receiver 120 upon receipt of the appropriate signal from the transmitter 100. While a garage door opening mechanism is illustrative, many other types of utility devices may be controlled by such remote transmitter-receiver system such as gates, light systems, security systems, etc.

When activated, the programmable transmitter 100 generates a signal 110 having a predetermined transmission frequency and a unique data transmission format, that is, the timing parameters and modulation characteristics related to encoded data are unique to the design of the particular transmitter. The receiver 120 is adapted to receive and decode the signals generated by the transmitter 100 to produce an output signal which is supplied to the utility device 130. In one embodiment, the transmitter 100 and the receiver 120 transmit and receive at a single transmission frequency, using a single data transmission format. In alternative embodiments, multi-format and/or multi-frequency systems may be implemented.

The transmitter 100 and receiver 120 typically have a selectable code (or address) that is set using a plurality of DIP switches in each unit. Identical codes are required for communication between a transmitter 100 and a receiver 120. Setting the DIP switches to identical settings (on or off) in each unit provides identical codes. Communication between the transmitter 100 and receiver 120 is accomplished according to a specific data transmission format which typically is unique to devices provided by the manufacturer of the specific transmitter-receiver system. There are many different transmission formats used by various manufacturers. Exemplary transmission formats are described in U.S. Pat. No. 5,841,390, invented and owned by the inventor and owner of the present application, the contents of which are fully incorporated herein by reference.

Figure 2:
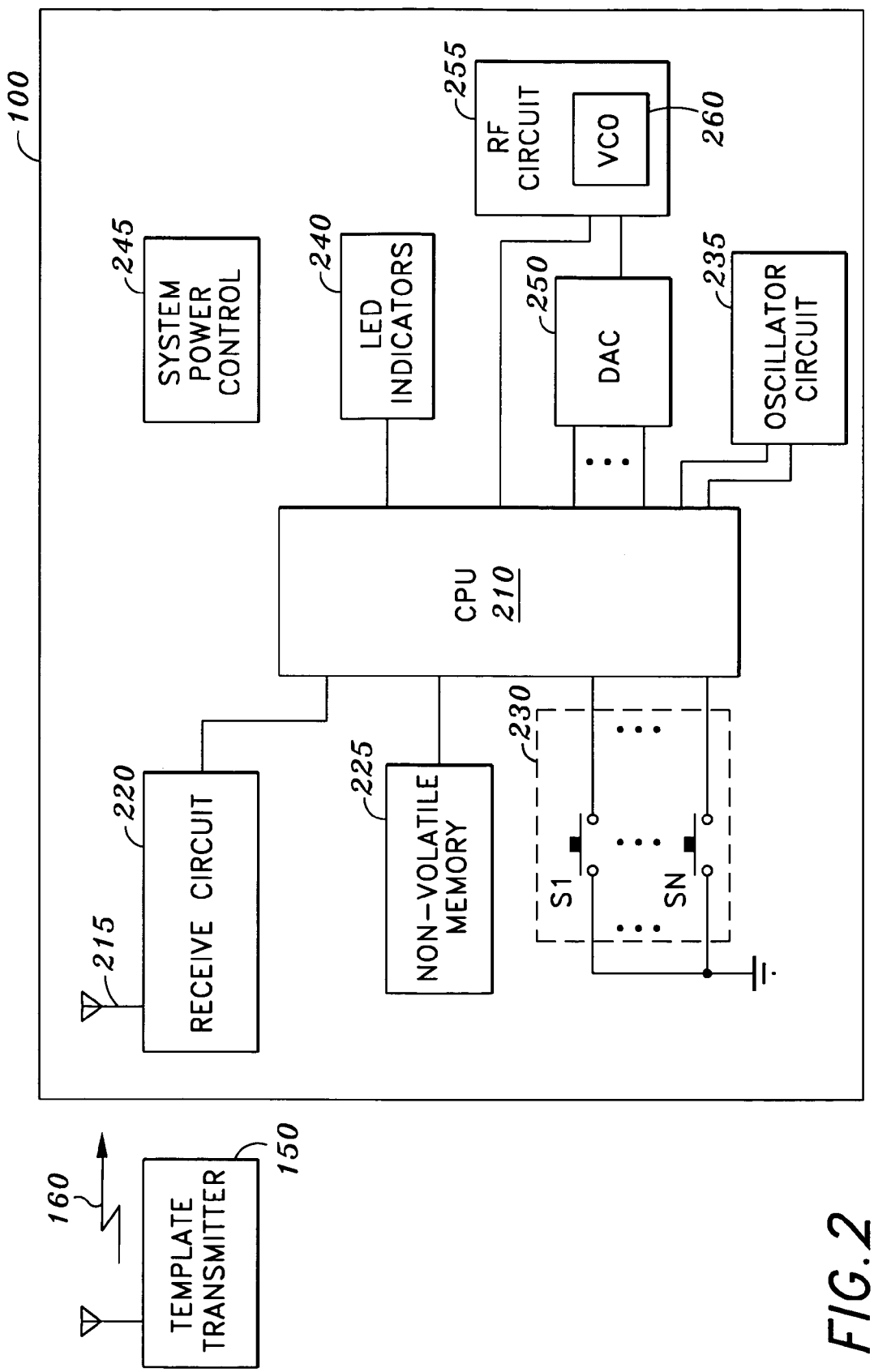
FIG. 2 is an exemplary block diagram of a universal transmitter, according to one embodiment.

FIG. 2 is an exemplary block diagram of a universal transmitter 100, according to one embodiment. The universal transmitter 100 is capable of determining the frequency and modulation pattern of a signal 160 transmitted by an existing transmitter 150, which serves as a template to the universal transmitter 100. In one embodiment, the template transmitter 150 is a transmitter that emits a signal at a particular frequency and with a particular modulation pattern that is recognized by the receiver of a remote controlled device such as receiver 120 (FIG. 1), and functions to actuate that device. The modulation pattern may be a pulse-code modulation, frequency shift keying, pulse amplitude modulation, or any other transmission pattern. After the transmission frequency and modulation pattern are "learned", the programmed universal transmitter 100 functions to actuate the same device or devices controlled by the template transmitter 150.

Referring to FIG. 2, the transmitter 100 includes a central processing unit (CPU) 210, an antenna 215, receive or input circuit 220, non-volatile memory 225, a plurality of switches 230, oscillator circuit 235, light emitting diode (LED) circuit 240, system power control circuit 245, digital to analog converter (DAC) 250, a voltage controlled oscillator (VCO) circuit 260, and radio frequency (RF) circuit 255. The CPU 210 may be a microprocessor, microcontroller, digital signal processor (DSP), etc. The oscillator circuit 235 provides internal timing for the CPU 210. The non-volatile memory 225 is a programmable non-volatile memory such as a non-volatile random access memory (NVRAM), electrically erasable programmable read only memory (EEPROM), flash memory, or other reprogrammable memory for storing time intervals representative of a modulation pattern and data representative of a modulation frequency for each switch. In one embodiment, data values are stored in and retrieved from the memory 225 in a serial fashion. In one embodiment, the memory 225 can store between 1,000 to 8,000 or greater bits of information.

The DAC 250 includes a resistor network which receives a plurality of inputs from the CPU 210 and provides an analog output voltage to the VCO 260. The output voltage of the DAC 250 dictates the transmission frequency of a signal transmitted by the RF circuit 255.

The transmitter 100 may include "N" switches 230 to allow a user to program the transmission frequency and modulation pattern of up to N different template transmitters. LED indicators 240 provide a visual indication of the operation of the transmitter 100.

Figure 3B:
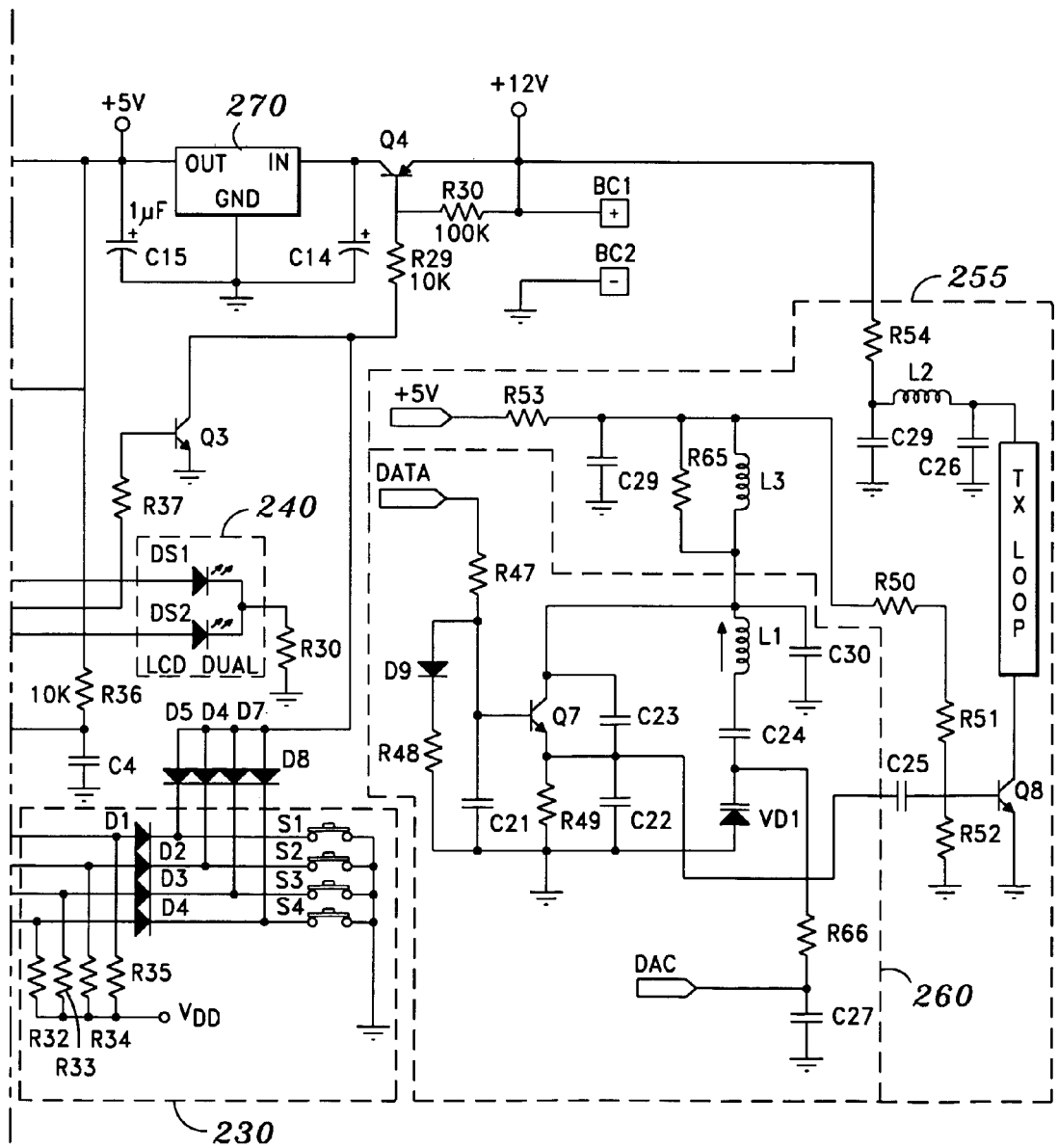

FIGS. 3A and 3B illustrate a detailed circuit diagram of the universal transmitter 100 of FIG. 2, according to one embodiment. Referring to FIGS. 3A and 3B, the transmitter 100 includes an antenna 215 that receives modulated signals from a template transmitter 150 (FIG. 2) and from the RF circuit 255, and passes the modulated signals to the receive circuit 220. The receive circuit 220 includes amplifier transistor stages Q5 and Q6 and amplifier stages U3A and U3B. Transistor Q5 operates to mix the modulated signals from the template transmitter and the RF circuit 255, and provide an intermodulated output signal. Transistor Q6 amplifies the output signal and amplifiers U3A and U3B provide waveshaping of the signals to provide accurate reading of the signal pattern by the CPU 210. The output of the waveshaping amplifier U3B is coupled to input pins PB2 and PC5 of the CPU 210.

In the embodiment shown, the switch array 230 includes four switches S1–S4. Each switch S1–S4 may be programmed to store a unique modulation frequency and modulation pattern of a template transmitter, thereby allowing the universal transmitter 100 to control four different receivers, and thus four different devices. It is to be appreciated that more or less switches may be provided. The CPU 210 is coupled to the non-volatile memory 225. During a learning mode, the CPU 210 stores data values representative of the modulation frequency and modulation pattern "learned" from a template transmitter in the memory 225, and associates the data values with one of the switches S1–S4. During a transmit mode, the CPU 210 retrieves data values representative of the modulation frequency and modulation pattern associated with the actuated switch from memory 225. Data is written into the memory 225 serially via pin PA0, and is read from the memory 225 serially via pin PB5. In another embodiment, instead of storing the modulation frequency of a signal in memory 225, the CPU 210 may store a value or a pointer, which represents or points to a list of predetermined frequency values (e.g., which may be stored in the internal read-only memory of the CPU 210).

The CPU 210 output pins PA0–PA3, PC0–PC4, and PG0 are coupled to the DAC 250, which includes a resistor network. In the embodiment shown, the DAC 250 provides a 10-bit resolution. However, the DAC 250 may be designed to provide a higher or lower resolution. The output of the DAC 250 is coupled to the VCO 260. Depending on the digital voltage level on outputs pins PA0–PA3, PC0–PC4, and PG0, the output of the DAC 250 provides an output voltage between zero and five volts to the VCO 260. The VCO 260 is employed to generate signals having a transmission frequency over a wide frequency range in response to the output of the DAC 250 (e.g., 100 MHz to 1 GHz). In one embodiment, the VCO 260 is controlled to generate signals having a transmission frequency over 280 MHz to 450 MHz. However, it is to be understood that the VCO 260 may generate signals having a transmission frequency over a different frequency range.

The analog output voltage of the DAC 250 controls the capacitance of a varactor diode VD of the VCO 260 to generate the appropriate transmission frequency. Thus, the output frequency of the RF circuit 255 increases or decreases according to the control input voltage from the DAC 250. For example, if the VCO 260 can operate within 280 MHz to 450 MHz, then zero volts on the DAC output can correspond to the VCO 260 generating a 280 MHz signal and five volts on the DAC output can correspond to the VCO 260 generating a 450 MHz signal. When the CPU 210 output pins PA0–PA3, PC0–PC4, and PG0 are zero, the DAC 250 output voltage is zero since no current passes through resistor R20. Therefore, the VCO 260 will provide an operating frequency of 280 MHz. Conversely, when the CPU 210 output pins PA0–PA3, PC0–PC4, and PG0 are all high (five volts), the output voltage of the DAC 250 is 5 volts and the current passing through resistor R20 is 0.5 mA.

As a result, the VCO 260 will provide an operating frequency of 450 MHz. To operate the VCO 260 in between 280 MHz to 450 MHz, some of the CPU 210 output pins will be high and some will be low.

The transistor Q7 and the associated capacitors and resistors act as a Colpitts oscillator. A tunable inductor L1 is in series with capacitor C24. The oscillation frequency of the VCO 260 is coupled to an RF power transistor Q8 for transmission. The PB4 output pin of the CPU 210 is coupled to the VCO 260 of the RF circuit 255. When the PB4 output is low, transistor Q7 is off to deactivate the VCO 260. Conversely, when the PB4 output is high, transistor Q7 is on to activate the VCO 260. During transmit mode, the CPU 210 retrieves the ON and OFF intervals, representing the transmission format, from memory 225. The CPU 210 turns Q7 on to activate the VCO 260 during the ON interval, and turns off Q7 to deactivate the VCO 260 during the OFF intervals.

The RF circuit 255 includes a transmitting antenna 265 that operates in conjunction with the VCO 260 and transistor Q7 to generate and transmit signals having a desired transmission frequency and transmission format. In one embodiment, the antenna 265 operates to generate and transmit signals in the frequency range between about 100 MHz to 1 GHz. The antenna 265 may be implemented as a trace on a printed circuit board (PCB) or as a preformed wire that is soldered onto the PCB.

The universal transmitter 100 includes a voltage regulator 270 that receives an input voltage (e.g., 12 volts), and provides a 5 volt regulated output. In an inactive state, where none of the switches S1–S4 are pressed, transistor Q4 is off and de-couples the 12 volt supply from the input of the voltage regulator 270. When one (or more) of the switches S1–S4 is(are) pressed, the base of transistor Q4 drops sufficiently below 12 volts to turn on Q4 and couple the 12 volt supply to the input of the voltage regulator 270. Consequently, the output of the voltage regulator 270 goes from 0 volts to 5 volts. The 5 volt supply is then applied to the components and devices in the universal transmitter 100. Initially, when the output of the voltage regulator 270 goes from 0 to 5 volts, the reset input pin (RES/) of the CPU 210 is low (capacitor C4 has no charge) causing the CPU 210 to be in a reset state. As the capacitor C4 charges, eventually to 5 volts, the reset pin goes high causing the CPU 210 to execute instructions from its internal read-only memory or micro-code. The CPU 210 may perform an initialization routine. Additionally, after power is supplied to the CPU 210, the CPU 210 may apply 5 volts on the PB1 output pin to turn on transistor Q3 and keep transistor Q4 on and thus main power, even if the switches are released prematurely, in order to complete the current operation. Thus, for example, in a transmit mode, if a switch is pressed to transmit a signal (e.g., garage door opener) and the switch is released before the transmitter transmits the signal, the CPU 210 can maintain power to the transmitter until the signal is transmitted, and then remove power by turning off Q3.

Once initialization is complete, the CPU 210 determines which of the switches S1–S4 was pressed by monitoring input pins PA4 to PA7. If a switch is pressed and released before the expiration of a predetermined time period (e.g., 3 seconds), then the universal transmitter 100 will enter a transmit mode to transmit a modulation pattern at a transmission frequency associated with the actuated switch. If a switch is pressed and held for at least the predetermined time period (e.g., 3 seconds), the universal transmitter will enter a "learning" mode to "learn" the transmission frequency and transmission format of a template transmitter.

In the transmit mode, the CPU 210 retrieves data representative of the transmission format (e.g., the ON and OFF intervals) and the transmission frequency, associated with the actuated switch, from the non-volatile memory 225. The CPU 210 then outputs appropriate values (0 or 5 volts) on output pins PA0–PA3, PC0–PC4, and PG0 to the DAC 250. The DAC 250 converts the digital values to an analog voltage (e.g., from 0 to 5 volts). This analog voltage is provided to the VCO 260. The VCO's frequency is adjustable or tunable via the varactor diode VD. The CPU 210 also turns transistor Q7 on and off in accordance with the ON and OFF intervals retrieved from memory 225 to cause the RF circuit 255 to transmit a signal having the transmission frequency and transmission format associated with the actuated switch. Once the signal is transmitted, the CPU 210 may enter the inactive mode by driving output pin PB1 to zero, which turns off transistors Q3 and Q4. Turning off transistor Q4 de-couples the 12 volt supply from the voltage regulator 270 and thus power is removed from the transmitter 100. During transmission, the LED's 240 are switched ON and OFF in accordance with the desired modulation pattern transmitted by the universal transmitter 100.

In the learning mode, the CPU 210, executing internal program code, causes the RF circuit 255 to transmit a signal (hereinafter referred to as the "local signal") having a scanning frequency $f_s$ starting from a lowest frequency on a defined spectrum (S) to the highest frequency in the spectrum (e.g., 280 MHz to 450 MHz) at one or more predetermined steps. Most template transmitters in North America transmit signals within the frequency range of 300 MHz to 434 MHz. Therefore, in the current exemplary embodiment, the frequency spectrum is defined from 280 MHz to 450 MHz. It should be noted that a different and/or wider frequency range may be employed. The local signal is received by the antenna 215, which also receives a signal from the template transmitter (hereinafter referred to as the "target signal"). The target signal transmitted from the template transmitter has a particular frequency $f_c$ (hereinafter referred to as the "target frequency"). The purpose of the scanning frequency $f_s$ is to locate the target frequency $f_c$ from the template transmitter. The target signal is defined as $V_1$ while the local signal is defined as $V_2$, and can be expressed as follows:

$$V_1 = V_{1m} \cos(\omega_c t + \phi), \text{ and} \tag{1}$$

$$V_2 = V_{2m} \cos(\omega_s t), \tag{2}$$

where,

V1 is the transmitted RF signal from the template transmitter,

V2 is the signal transmitted by the universal transmitter 100, $\omega_c$ is the reciprocal of target frequency $f_c$ of the template transmitter (fixed), $\omega_s$ is the reciprocal of scanning frequency $f_s$ (which changes in this exemplary embodiment between 280 MHz to 450 MHz during the learning mode), and $\phi$ is the data signal. It should be noted that the local signal is just a frequency carrier and does not contain a data signal $\phi$.

Figure 9:
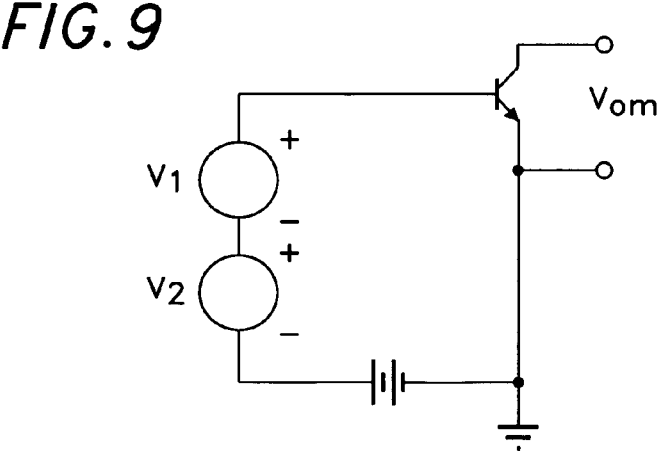
FIG. 9 shows a circuit diagram for mixing the target signal with the local signal.

Both signals (V1) and (V2) are received by the antenna 215 and coupled to the base of the transistor Q5. Transistor Q5 exhibits amplitude-nonlinear behavior, and thus serves as a mixer. Mixing is achieved by the application of two signals to a nonlinear device. The resulting mixed signal can generally be expressed in following form:

$$V_{om} = V_1 \times V_2 = \frac{1}{2} V_{1m} V_{2m} \cos((\omega_c - \omega_s)t + \phi), \tag{3}$$

where,

Vom, is the output signal from transistor Q5, and provides the sum or difference signal of the target signal (V1) and local signal (V2) after mixing, as depicted in FIG. 9.

According to equation (3), the output signal Vom varies according to the reciprocal of the frequencies $\omega_c$ and $\omega_s$. The Vom signal is produced by the intermodulation of the transistor Q5. The scanning frequency $f_s$ of the local signal increases by predetermined steps. As the local signal (V2) approaches the target signal (V1), the intermodulation amplitude appears and increases until the frequency of both local and source signals are very close, e.g., when $$\left| \frac{1}{\omega_c} - \frac{1}{\omega_s} \right| \approx 300 \text{ KHz}.$$

Figure 4:
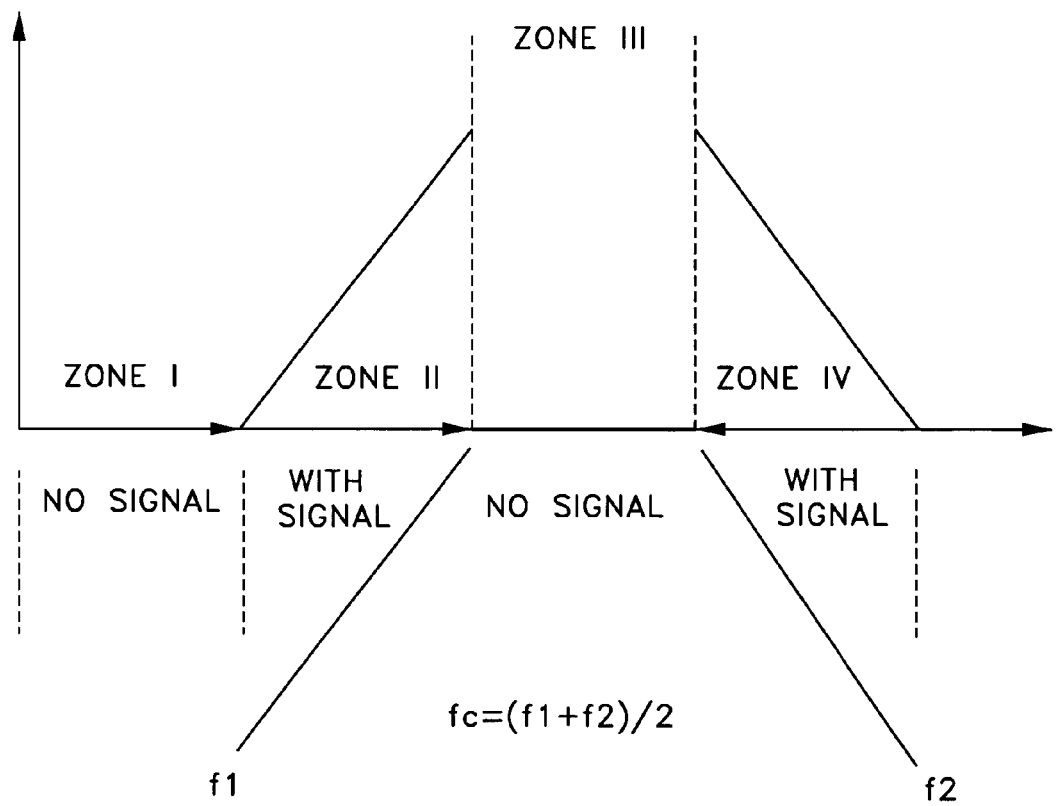
FIG. 4 is a graph illustrating a spectrum of the output signal $V_{om}$, according to one embodiment.

FIG. 4 is a graph illustrating a spectrum of the output signal $V_{om}$, according to one embodiment. The horizontal axis of the graph represents frequency, while the vertical axis represents the signal level detected by the CPU 210. The graph is divided into four zones and is not to scale. For example, in this embodiment, zones II and IV each represents about a 20 MHz frequency range, while zone III represents about a 500 kHz frequency range. When the frequency of the local signal is substantially different than the frequency of the target signal (e.g., on the order of 20 MHz or greater) the output signal $V_{om}$ is substantially zero. This is represented by zone I in FIG. 4. Zones II and IV represent the regions of the spectrum where $\omega_c \ne \omega_s$ but are not substantially different (e.g., where $f_c$ and $f_s$ are within 20 MHz or so of each other). In zones II and IV, the output signal $V_{om}$ can be detected by the CPU 210.

When the frequency of the source signal is substantially the same as the frequency of the local signal ($\omega_c = \omega_s$) the Vom output signal is equal to zero according to equation (3). This is represented by zone III. When no signal is detected, the CPU 210 knows that the target frequency is within zone III, and will continue to search in order to determine the target frequency $f_c$.

Figure 5:
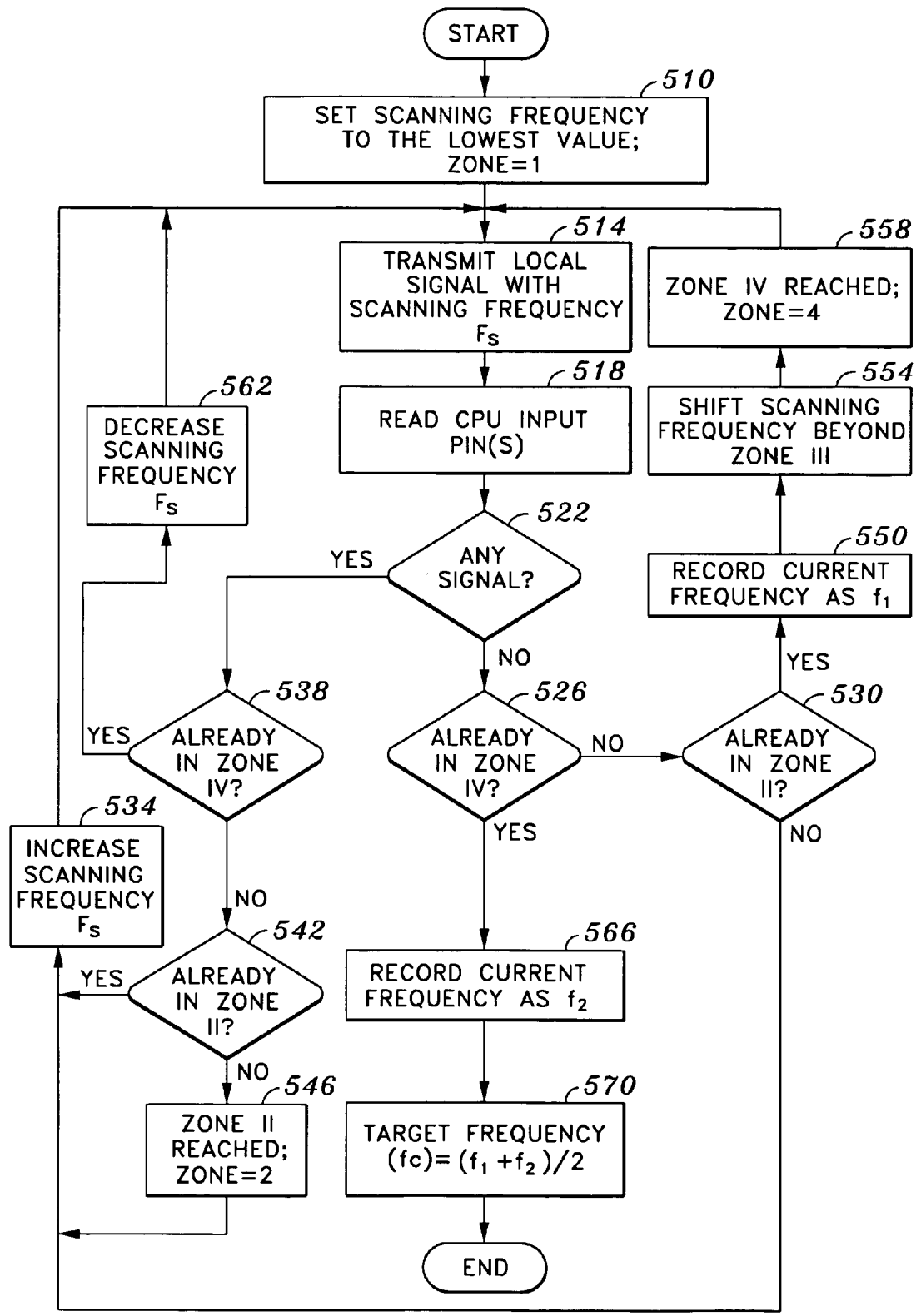
FIG. 5 illustration a flow diagram of a process or method executed by the CPU during frequency learning, according to one embodiment.

FIG. 5 illustrates an exemplary flow diagram of a process or method 500 executed by the CPU 210 to determine the target frequency $f_c$, according to one embodiment. Referring to FIG. 5, the process 500 commences at block 510 where the scanning frequency $f_s$ is set to the lower limit value (e.g., 280 MHz) and a zone variable is set to 1, indicating zone 1. Other parameters may be initialized at block 510. The process then moves to block 514 where the CPU 210 controls the VCO 260, via DAC 250, and the RF circuit 255 to transmit a local signal having a scanning frequency of 280 MHz. At block 518, the CPU 210 reads one or both of the input pins PB2 and PC5. At block 522, the CPU 210 determines whether any signal is detected at the input pin(s). If a signal is not detected at block 522, the process moves to block 526 where the process determines whether the zone variable is equal to 4 (i.e., whether scanning frequency $f_s$ is in zone IV). Since the zone variable is 1, the process moves to block 530. Again, since the zone variable is not equal to 2, the process takes the "NO" path to block 534. At block 534, the process increases the scanning frequency $f_s$ by a predetermined amount. In one embodiment, the scanning frequency $f_s$ is increased by 5 MHz. However, it is to be appreciated that the scanning frequency may be increased by a smaller or greater amount. The process then moves back to block 514 where the CPU 210 causes the RF circuit 255 to output a signal having the new scanning frequency (in this case 285 MHz).

The process executes blocks 514, 518, 522, 526, 530, and 534 in sequence and the scanning frequency is sequentially increased until a signal, having predetermined signal strength, is detected by the CPU 210 at block 522. The process then moves to block 538 where a determination is made as to whether zone is equal to 4. If not, the process moves to block 542 where a further determination is made as to whether zone is equal to 2. Note that blocks 538 and 542 may be combined in software using a case statement or equivalent. Since zone is still equal to 1, the process moves to block 546. At block 546, zone is set to 2 indicating that zone II has been reached. The process moves to block 534 where the scanning frequency is increased by the predetermined increment (e.g., 5 MHz). Note that a different predetermined increment may be used when the process is in zone II (e.g., 2 MHz). While in zone II, blocks 514, 518, 522, 538, 542, and 534 are executed in sequence (as the signal level detected by the CPU 210 increases) until, at block 522, no signal or appreciable signal is detected by the CPU 210. When no signal is detected, the process moves to block 526. Since zone is equal to 2, the process continues to block 530. Now, since zone is equal to 2, the process moves to block 550.

At block 550, the CPU 210 records the current scanning frequency as $f_1$ as zone III has been reached. At block 554, the process increases the scanning frequency $f_s$ past zone III. This can be accomplished by increasing the scanning frequency $f_s$ by some value greater than the width of zone III, which, in the current exemplary embodiment, is 500 kHz. For example, the scanning frequency may be increased by 1 MHz, 2 MHz, 5 MHz, etc. At block 558, zone is set to 4. The process then moves back to block 514 where the CPU 210 causes the RF circuit 255 to transmit a local signal having the new scanning frequency $f_s$ in zone IV. At block 518, the CPU 210 reads its input pin(s). At block 522, the CPU 210 will detect a signal at its input pin(s) since the scanning frequency $f_s$ is in zone IV (zone=4), and thus the process moves to block 562 through block 538. At block 562, the scanning frequency is decreased by some predetermined amount, which may be different than the predetermined amount added to the scanning frequency in block 534. In one embodiment, the predetermined amount may be 1 MHz, 2 MHz, etc.

Blocks 514, 518, 522, 538, and 562 are executed in sequence and the scanning frequency is iteratively decreased until no signal or no appreciable signal is detected at the input pin(s) of the CPU 210 at block 522. Now, the process moves to block 526, and since zone is equal to 4, the process continues to block 566. At block 566, the current scanning frequency is recorded as $f_2$, as the right most edge of zone III is reached. Then, at block 570, the process determines the target frequency $f_c$, which is somewhere in the region between $f_1$ and $f_2$. In one embodiment, the target frequency $f_c$ is determined by the following expression:

$$f_c = \frac{f_1 + f_2}{2}. \quad (4)$$

The process then returns.

Once the target frequency $f_c$ is determined, the CPU 210 may store the value or data representative of the value in internal random access memory, and proceed with the code format learning process.

Figure 6:
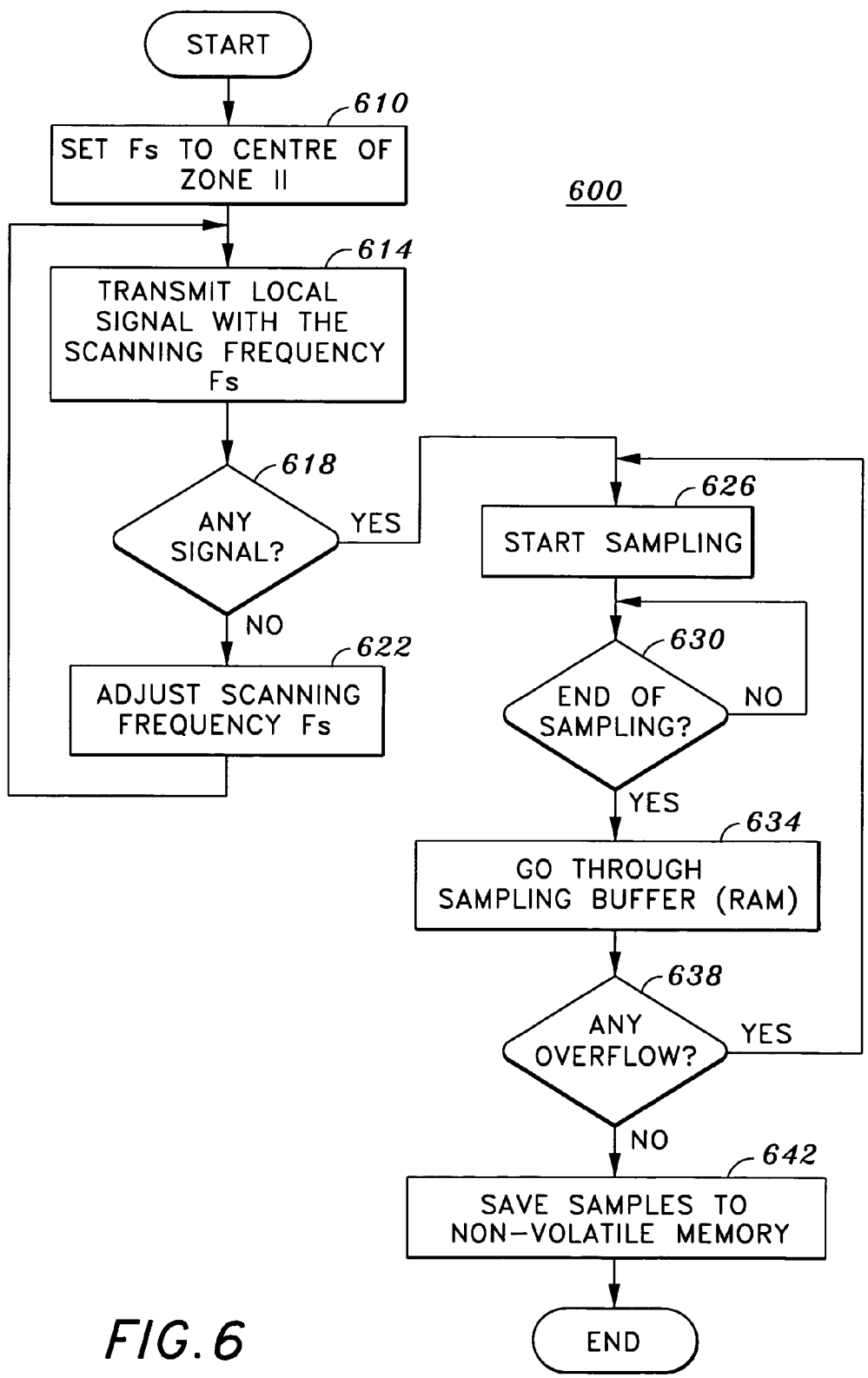
FIG. 6 illustrates a flow diagram of a process for detecting the transmission format, according to one embodiment.

FIG. 6 illustrates a block diagram of a code format learning process 600, according to one embodiment. The strength of the received signal at the input pin(s) of the CPU 210 is greater when the scanning frequency $f_s$ is somewhere in zone II or zone IV. For sake of illustration, the process 600 will use zone II.

Referring to FIG. 6, the process 600 commences at block 610 where the scanning frequency $f_s$ is set to a frequency located in zone II. In one embodiment, the scanning frequency $f_s$ is set to be substantially in the middle of zone II. It is to be noted that the scanning frequency $f_s$ may be anywhere in zone II as long as the strength of the signal is sufficiently strong to allow the CPU 210 to detect the code format from the template transmitter. At block 614, the CPU 210 causes the RF circuit 255 to transmit a local signal having a scanning frequency $f_s$ located in zone II. At block 618, the CPU 210 monitors one or both of its input pins PC2 and PB5 to detect a signal. If a signal is not detected or if a signal greater than a lower threshold is not detected, the process (at block 622) adjusts the scanning frequency $f_s$. In one embodiment, the process increases the scanning frequency $f_s$ by a predetermined amount. The process moves again to block 614 to cause the RF circuit 255 to transmit a local signal having the modified scanning frequency $f_s$. If, at block 618, the process detect a signal of detects a signal greater than the lower threshold, the process moves to block 626.

Figure 7:
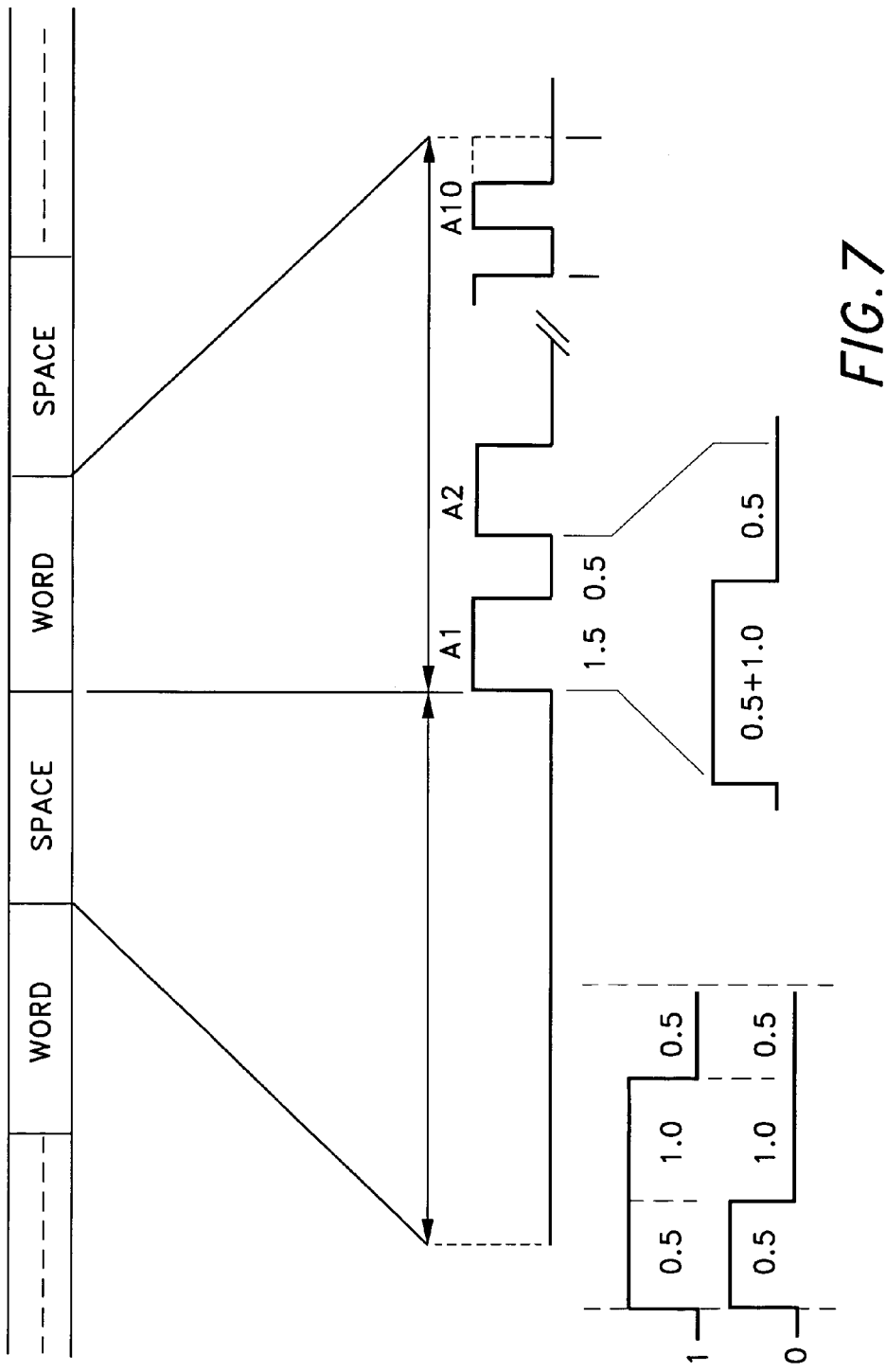
FIG. 7 illustrates a modulation pattern for an S code format.
Figure 8:
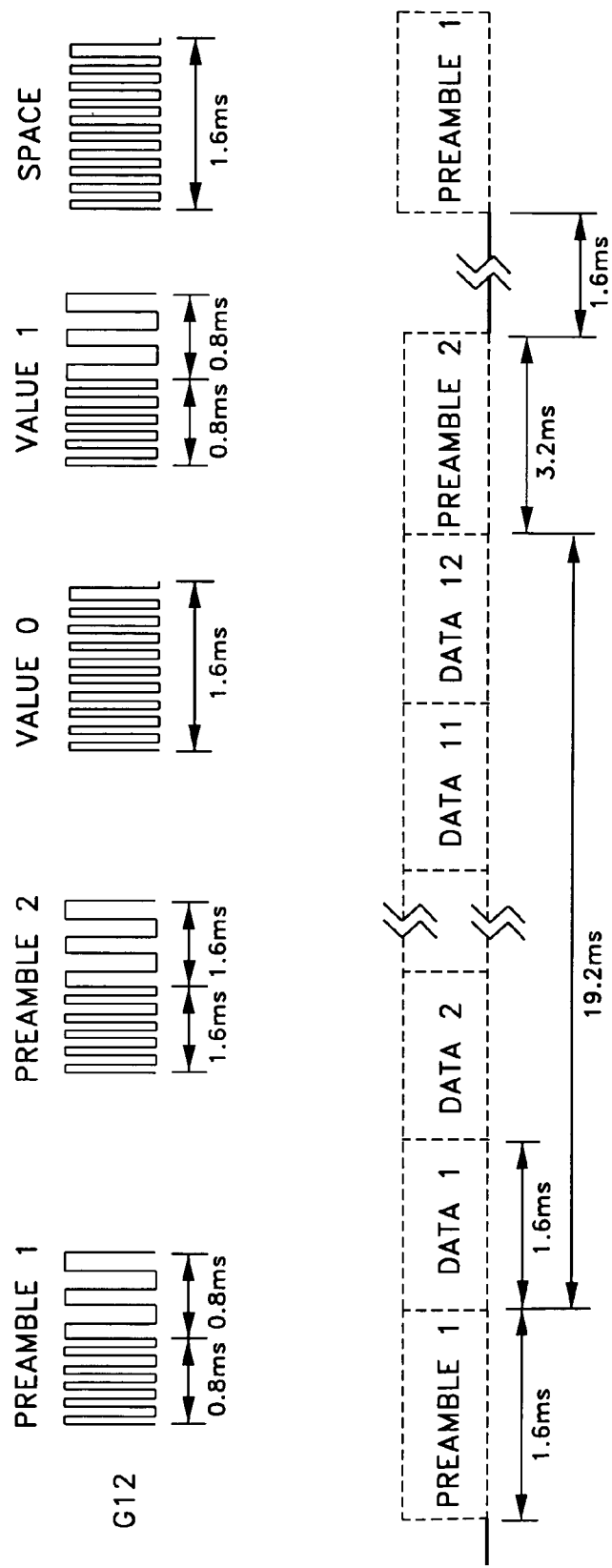
FIG. 8 illustrates a modulation pattern for a G12 code format.

At block 626, the CPU 210 samples one or both of its input pins PB2 and PC5. In one embodiment, the PB2 input pin is used to sample and detect a first code format (e.g., pulse-modulated) and the PC5 input pin is used to sample and detect a second code format (e.g., frequency shift keying) to account for the different code formats used by garage door openers, car alarms, and other wireless transmitting devices. Note that a single input pin may be used to detect more than one code format. Alternatively, more than two input pins may be used to detect different code formats. FIG. 7 shows a first type of code format (e.g., S code) that may be detected by sampling the PB2 input pin, while FIG. 8 shows a second type of code format (e.g., G12 code) that may be detected by sampling the PC5 input pin.

According to the code format in FIG. 7, ten samples of the code (a word) are collected between two spaces. According to the code format in FIG. 8, twelve samples are collected between the first and second preambles. The CPU 210 stores the samples for each code format in a separate buffer in internal random access memory (RAM). At block 634, the CPU 210 interrogates each buffer in RAM. If there is an overflow, the process repeats blocks 626, 630, and 634 until a correct sample is obtained or a timeout occurs. At block 642, the CPU 210 stores the samples in non-volatile memory 225 associated with the switch S1–S4 used to trigger the learning mode. Additionally, the CPU 210 stores data values representative of the target frequency $f_c$ in the memory 225.

One or more embodiments may be implemented as a method, apparatus, system, computer program product, etc. When implemented in software, the elements are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc.

While the preceding description has been directed to particular embodiments, it is understood that those skilled in the art may conceive modifications and/or variations to the specific embodiments and described herein. Any such modifications or variations which fall within the purview of this description are intended to be included therein as well. It is understood that the description herein is intended to be illustrative only and is not intended to limit the scope of the invention. Rather the scope of the invention described herein is limited only by the claims appended hereto.

What is claimed is:

1. A universal transmitter, comprising:
    an input circuit including an antenna, a central processing unit (CPU) coupled to the input circuit, and a radio frequency (RF) circuit coupled to the CPU;
    said CPU to generate a plurality of discrete digital outputs;
    said RF circuit, in response to the plurality of discrete digital outputs, to generate and transmit a local RF signal at a scanning frequency;
    said input circuit to receive the local RF signal and a template RF signal including a target frequency and a modulation pattern, and to mix the local RF signal and the template RF signal and provide a mixed signal; and
    said CPU to (i) incrementally increase the scanning frequency of the local RF signal by a first predetermined amount, starting from a lower scanning frequency, until a magnitude of the mixed signal, above a lower threshold value, is detected, (ii) incrementally increase the scanning frequency of the local RF signal by a second predetermined amount until the magnitude of the mixed signal falls to or below the lower threshold value, (iii) store the current scanning frequency as a first frequency; (iv) increase the scanning frequency by a third predetermined amount; (v) incrementally decrease the scanning frequency by a fourth predetermined increments until the magnitude of the mixed signal falls to or below the lower threshold value; (vi) store the current scanning frequency as a second frequency, and (vii) determine the target frequency as being between the first and second frequencies.

2. The transmitter of claim 1 wherein the CPU to set the scanning frequency of the local RF signal to a frequency below the first frequency or above the second frequency, and to sample the mixed signal at the set scanning frequency to determine the modulation pattern of the template RF signal.

3. The transmitter of claim 1 wherein the first and second predetermined amounts are equal, and wherein the lower threshold value is substantially equal to zero.

4. The transmitter of claim 1 wherein the CPU to sample the mixed signal at a set scanning frequency where a magnitude of the mixed signal is above a threshold value to determine the modulation pattern of the template RF signal.

5. The transmitter of claim 1 wherein the CPU generates the plurality of discrete digital outputs to cause the RF circuit to generate and transmit the local RF signal over a frequency range.

6. The transmitter of claim 5 wherein the frequency range is between 100 MHz and 1 GHz.

7. The transmitter of claim 5 wherein the frequency range is between approximately 280 MHz and 450 MHz.

8. The transmitter of claim 1 further comprising an analog to digital converter coupled between the CPU and the RF circuit, said digital to analog converter to detect the digital outputs of the CPU and, in response thereto, to provide an analog voltage to the RF circuit to control the scanning frequency of the local RF signal.

9. The transmitter of claim 8 wherein the RF circuit includes a voltage controlled oscillator (VCO) coupled to the digital to analog converter, said VCO to control the scanning frequency in response to the analog voltage provided by the digital to analog converter.

10. The transmitter of claim 1 wherein the input circuit comprises an amplifier circuit for amplifying the mixed signal and a wave shaping circuit.

11. The transmitter of claim 2 further comprising a non-volatile memory to store values representative of the target frequency and modulation pattern.

12. The transmitter of claim 1 further comprising a plurality of switches, wherein when a switch is pressed and held for a first predetermined time period, the CPU learns the target frequency and modulation pattern of the template transmitter, and stores values representative of the target frequency and modulation pattern in the non-volatile memory.

13. The transmitter of claim 12 wherein when the switch is pressed and held for a second predetermined time period, the CPU retrieves the values representative of the target frequency and modulation pattern, associated with the switch, from the non-volatile memory and generates digital outputs to cause the RF circuit to transmit an RF signal having the target frequency and modulation pattern.

14. A method of learning a target frequency and modulation pattern of a template transmitter, comprising:
    transmitting, by a radio frequency (RF) circuit, a local RF signal at a lower scanning frequency;
    concurrently receiving and mixing, by an input circuit, the local RF signal and a template RF signal including the target frequency and the modulation pattern, to provide an output signal;
    incrementally increasing the scanning frequency of the local RF signal, by a first predetermined amount, until a magnitude of the output signal that is above a first threshold value is detected;
    incrementally increasing the scanning frequency of the local RF signal, by a second predetermined amount, until the magnitude of the output signal falls to or below a second threshold value;
    storing the current scanning frequency as a first frequency;
    increase the scanning frequency of the local RF signal by a third predetermined amount;
    incrementally decreasing the scanning frequency of the local RF signal, by a fourth predetermined amount, until the magnitude of the output signal falls to or below a third threshold value;
    storing the current scanning frequency as a second frequency;
    determining the target frequency as a function of the first and second frequencies;
    adjusting the scanning frequency of the local RF signal to below the first frequency or greater than the second frequency; and sampling the output signal a plurality of times to determine the modulation pattern of the template RF signal.

15. The method of claim 14 wherein determining the target frequency comprises adding the first and second frequencies to provide a sum, and diving the sum by two.

16. The method of claim 15 wherein prior to the transmitting the local RF signal the method comprises pressing and holding a switch for a first predetermined time period.

17. The method of claim 14 further comprising storing values representative of the target frequency and the modulation pattern in a non-volatile memory.

18. The method of claim 17 further comprising:
pressing and holding the switch for a second predetermined time period;
retrieving the values from the non-volatile memory; and
generating digital outputs to cause the RF circuit to transmit an RF signal having the target frequency and modulation pattern.

19. The method of claim 14 wherein the first and second predetermined amounts are equal.

20. The method of claim 14 wherein the first, second, and third predetermined amounts are equal and approximately zero.

21. A computer program product, comprising:
a computer usable medium having computer readable program code embodied therein to learn a target frequency and a modulation pattern of a template transmitter in a universal transmitter, the computer readable program code in said computer program product comprising:
computer readable program code to generate a set of discrete digital outputs to cause a radio frequency (RF) circuit to generate and transmit a local RF signal at a corresponding set of discrete scanning frequencies;
computer readable program code to sample an input signal at the set of discrete scanning frequencies, said input signal being a function of the local RF signal and a template RF signal including the target frequency and the modulation pattern;
computer readable program code to provide digital outputs to incrementally increase a scanning frequency of the local RF signal by a first predetermined amount, starting from a lower scanning frequency, until a magnitude of the mixed signal, above a lower threshold value, is detected;
computer readable program code to provide digital outputs to incrementally increase the scanning frequency of the local RF signal by a second predetermined amount until the magnitude of the mixed signal falls to or below the lower threshold value;
computer readable program code to store the current scanning frequency as a first frequency;
computer readable program code to provide digital outputs to increase the scanning frequency by a third predetermined amount;
computer readable program code to provide digital outputs to incrementally decrease the scanning frequency by a fourth predetermined increments until the magnitude of the mixed signal falls to or below the lower threshold value;
computer readable program code to store the current scanning frequency as a second frequency; and
computer readable program code to determine the target frequency as being between the first and second frequencies.

* * * * *